Patented July 26, 1930

1,868,869

UNITED STATES PATENT OFFICE

JESSE B. BARNITT, OF PITTSBURGH, PENNSYLVANIA, ASSIGNOR TO ALUMINUM COMPANY OF AMERICA, OF PITTSBURGH, PENNSYLVANIA, A CORPORATION OF PENNSYLVANIA

ADSORBENT MATERIAL AND METHOD OF PRODUCING THE SAME

No Drawing.   Application filed November 28, 1928.   Serial No. 322,589.

In many arts the removal of an impurity or an undesired constituent of a gaseous or liquid mixture is a matter of prime importance, as for example the removal of water, in liquid or vapor form, from mixtures of gases, especially when under high pressure, in processes for separating gases of the air. In such processes removal of water down to a certain point is readily accomplished, in many cases at least, by what may be termed mechanical methods, such as compression and refrigeration, but for further removal recourse is had to "adsorption" or similar methods, in which the moisture-containing mixture is passed in intimate contact with a material, usually in a more or less finely divided state, which is capable of adsorbing or otherwise removing moisture, that is, seizing and holding moisture in preference to other substances present in the mixture. In some cases, especially where the moisture content is not high, the adsorption method alone may be used with satisfactory results.

Among the adsorbing agents heretofore used may be mentioned charcoal, for adsorbing noxious gases; and alumina and certain forms of silica, for selectively adsorbing moisture, gases, and vapors. The agents named, and others acting in a similar way, are capable of being regenerated; that is, the adsorbed substance or substances can be driven off by heating or other means, thereby rendering the agent again reactive and reusable.
Although many materials are known to have adsorptive properties only a comparatively few are known that can be employed on a large scale in continuous commercial operation, most of such agents being impractical for one reason or another, as for example high cost, or incapability of repeated regeneration.

It has been recognized for a long time that alumina possesses good adsorptive properties, and attempts have been made to use it for the purpose, but without real success, due largely to several difficulties inherent in the only forms which have heretofore been considered available. The forms referred to are those obtained by the Bayer and other precipitation processes, in which aluminum hydrate is precipitated in fine particles from solution. When properly prepared this fine alumina has high adsorptive properties and can be regenerated by simple heating but it possesses a serious disadvantage in that it packs or consolidates and hence prevents the free flow of gases and vapors through the mass and the necessary intimate contact of the gases and vapors with the alumina particles. This is especially disadvantageous when the adsorption must occur under substantial pressures, as in the liquefaction of air. When the gases to be treated are drawn downwardly through the alumina the packing or consolidation becomes so complete that the mass is made substantially impervious, and when the gases are drawn upwardly the mass "channels", so that the gases pass through a few channels and only a small portion of the total adsorbent surface is effective. Again, such alumina, and indeed most other adsorbents, is subject to disintegration by the repeated regeneration, the adsorbing particles crumbling to finer and finer size and even to dust, with the result that packing and consolidating becomes progressively worse and worse. Moreover, dust particles are carried off by the liquid or gas being treated and must be separated therefrom.

I have therefore been led to devise my present invention, which has for its object to provide an alumina adsorbent which shall possess in high degree the advantageous adsorptive properties of the compound and its capability of giving up the adsorbed substance under simple and easily attained conditions, but shall be virtually free from the defects which have heretofore militated against its use. In carrying out the invention I make use of a by-product of the manufacture of metallic aluminum, which hitherto has had no utility except for return to the aluminum process. The product referred to is the deposit or scale which forms in the precipitation tanks and discharge pipes employed in the Fickes-Sherwin process, which latter has for at least ten years been used in the United States to the practical exclusion of the older process. In the Fickes-Sherwin method sodium aluminate liquor containing particles of aluminum hydrate in suspension is subjected to agitation in large tanks with the result that the sodium aluminate in solution is decomposed and the alumina precipitated as aluminum hydrate. During the process, which is cyclic and continuous, a deposit forms more or less rapidly on the tank walls. This deposit or scale, which builds up in a tenacious layer-like form, is a disadvantage, since it must be removed from time to time, thus causing interruption of the precipitation process; and since frequent removal of a relatively thin deposit takes less time in the long run than does infrequent removal of a thick deposit the practice has been to chip out the scale at shorter intervals.

I have found that when broken up, crushed or ground, and calcined at a temperature between about 300° and 800° C., this deposit or scale has good adsorptive power, and that calcination at a temperature around 350° C. makes the material particularly active, with readier and more tenacious adsorption than the same material has when calcined at a higher or lower temperature. If completely calcined the scale is non-adsorbent, but partial calcination at a temperature between 300° and 400° C. imparts to the material the power of removing up to about 19 per cent of its own weight of water from air or other gas mixtures. It is not, however, always advantageous to utilize the full capacity of the material, as I have observed that its adsorptive efficiency begins to decrease rather rapidly when the amount of moisture taken up has reached about 14 per cent. More important in some processes, however, is the fact that the adsorption is virtually independent of the moisture content of the gas. That is, adsorption will go on at an efficient rate even when the amount of moisture is very small, so that substantially all the moisture can be removed from the gas, leaving it sensibly dry, whereas with certain forms of silica, hitherto considered the most effective agents, adsorption ceases when the moisture content of the gas being treated is as much as one or two per cent of saturation at the temperature and pressure of the treatment. In certain processes, for instance the separation of oxygen from the air by liquefaction, such an amount of moisture is especially undesirable.

My alumina adsorbent may be regenerated and reused an indefinite number of times. The regeneration, that is, the removal of the adsorbed substance, can be effected by simple heating or by other means, as for example by a vacuum. Methods of regeneration are well known and in some cases the methods used are different for different substances to be removed. Adsorbed moisture can be removed from the material by drawing air through the material at a temperature of about 100° to 125° C., or higher if more rapid removal is desired. Such regeneration may, as I have said, be repeated indefinitely. For example, my material has been regenerated more than a hundred times without any impairment of its adsorptive power.

Of equal, or indeed greater importance, is the fact that my alumina adsorptive material does not pack and that repeated regeneration and re-use, even under high pressure conditions does not impair its non-packing characteristics or cause dusting. On the contrary the pieces retain their angular form and size so that the interstices of the mass remain open for free dissemination of the gas or liquid, thus insuring maximum adsorbing surface. This permanence of size and form is of particular advantage in the clarification of liquids, or in the selective removal of a substance from liquid solutions or mixtures. Other adsorbents generally used for such purposes are in such finely divided form that filtration is required to effect their complete removal from the treated liquid, whereas my alumina adsorbent can be efficiently employed in pieces large enough to permit separation from the liquid by decanting the latter, or the liquid may be passed through masses of the material without floating the pieces thereof.

By the term "alumina scale" as used in the appended claims I mean the scale-like deposit formed on tanks in which aluminum trihydrate is precipitated from alkali aluminate solutions. As stated above, calcination is required to make the scale adsorbent, but the calcination must be partial only, as complete removal of all the water of hydration leaves the material useless for adsorption purposes. In general, the heating should be at not more than about 800° C. or less than about 300° C., preferably close to 350° C. By continuing the heating until substantially all the water has been expelled that can be driven off at the temperature employed a uniform product is conveniently obtained. At a temperature of 350° C. this can be done in one or two hours, even with the scale in pieces or chunks as large as the fist.

I claim—

1. In preparing a moisture-adsorbent material by the partial calcination of aluminum trihydrate, the step of subjecting to the calcination, aluminum trihydrate which is in the form of a hard, stony, non-friable scale precipitated from an alkali aluminate solution, and producing thereby an adsorbent material having high adsorptive properties, permanent in form and size, and capable of repeated regeneration and re-use without disintegration or material impairment of its adsorptive properties.

2. In preparing a moisture-adsorbent material by the partial calcination of aluminum trihydrate, the step of subjecting to calcination at a temperature between about 300° and 800° C., aluminum trihydrate which is in the form of a hard, stony, non-friable scale precipitated from an alkali aluminate solution, and producing thereby an adsorbent material having high adsorptive properties, permanent in form and size, and capable of repeated regeneration and re-use without disintegration or material impairment of its adsorptive properties.

3. In preparing a moisture-adsorbent material by the partial calcination of aluminum trihydrate, the step of subjecting to calcination at about 350° C., aluminum trihydrate which is in the form of a hard, stony, non-friable scale precipitated from an alkali aluminate solution, and producing thereby an adsorbent material having high adsorptive properties, permanent in form and size, and capable of repeated regeneration and re-use without disintegration or material impairment of its adsorptive properties.

4. Partially calcined alumina scale, capable of adsorbing moisture.

5. Partially calcined alumina scale which is adsorbent of water vapor to the extent of approximately 19 per cent of its own weight of water.

6. Partially calcined alumina scale capable of adsorbing moisture and in the form of pieces or particles incapable of packing or consolidating.

7. Partially calcined alumina scale in the form of non-packing or non-consolidating pieces or particles, capable of adsorbing moisture, and capable of repeated regeneration by heating without disintegration or substantial loss of its adsorptive properties.

8. An adsorbent agent for removing moisture or other undesired constituent or impurity from fluids, consisting of partially calcined alumina scale, in particles or pieces of a form and size adapted to prevent packing or consolidation in use, and capable of repeated regeneration and re-use without material impairment of its adsorptive properties.

9. An adsorbent agent for removing moisture or other undesired constituent or impurity from fluids, consisting of alumina scale, partially calcined at a temperature between about 300° and 800° C. as evidenced by its possession of marked adsorptive power, the calcined scale being capable of repeated regeneration and re-use without material impairment of such power.

10. Alumina scale, in non-packing or non-consolidating pieces or particles, calcined at a temperature of about 350° C. as evidenced by its capability of adsorbing approximately 19 per cent of its own weight of water, the calcined scale being capable of repeated regeneration and re-use as an adsorbent without material impairment of its adsorptive properties.

In testimony whereof I hereto affix my signature.

JESSE B. BARNITT.